March 5, 1946.  C. S. CLARK  2,396,084
PISTON
Filed Oct. 2, 1941
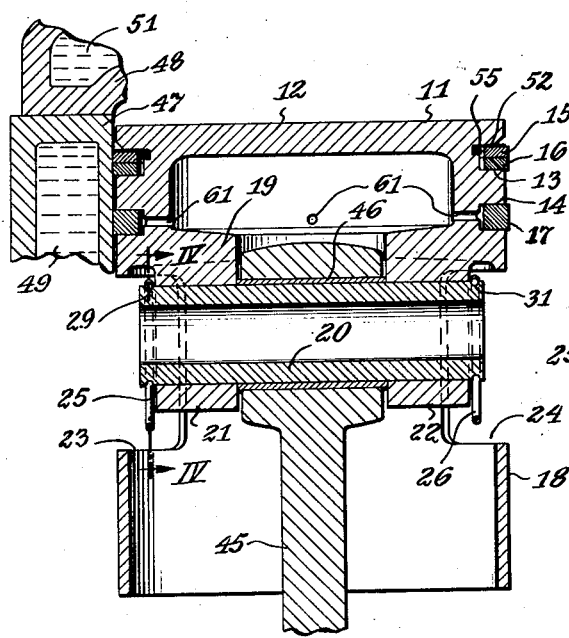
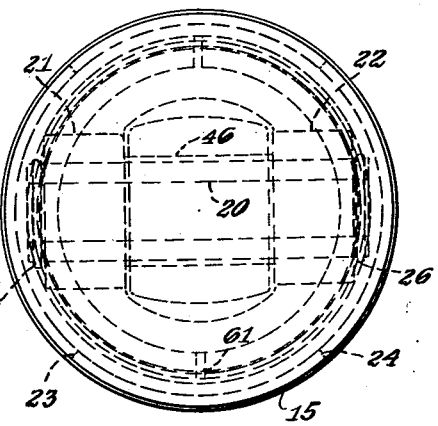
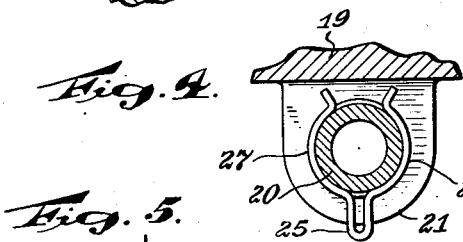
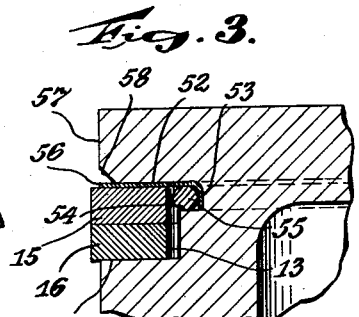
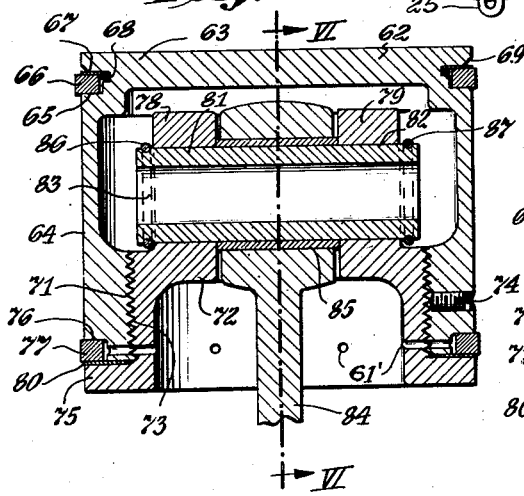
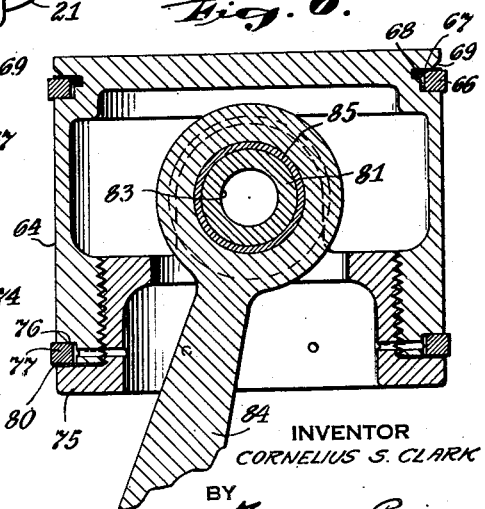
INVENTOR
CORNELIUS S. CLARK
BY Towson Price
ATTORNEY Patented Mar. 5, 1946

2,396,084

UNITED STATES PATENT OFFICE 2,396,084

PISTON

Cornelius S. Clark, Norfolk, Va.

Application October 2, 1941, Serial No. 413,259

8 Claims. (Cl. 309—44)

This invention relates to pistons, and more particularly to such in which a sealing ring or diaphragm is provided for minimizing leakage between piston and cylinder.

The principal object of my invention, generally considered, is to construct a piston of improved design in which sealing means, additional to the ordinary piston rings, is provided for minimizing leakage between piston and cylinder, and where its length may be shortened by pivoting the associated connecting rod thereto near its head end, rather than near the skirt edge.

Another object of my invention is to provide a piston having a sealing ring or diaphragm of thin metal disposed between its head end ring and the portion thereof defining the head side of the ring groove, said ring being angular in section rather than flat so that an inner flange is provided for engagement with the bottom of the groove, locking means, such as a wire, overlying said flange for holding said sealing ring in place in its groove.

A further object of my invention is the provision of a piston with the sealing strip adjacent the outer surface of its head, said strip being received in an extension of the normal head and piston ring groove and held in place by a locking wire disposed therein and engaging a lateral extension on said strip.

A still further object of my invention is to provide a piston having a groove normally receiving an oil ring, with ports leading from said groove to the interior of the piston for feeding oil from the exterior piston surface past the wrist pin and back into the crank case of the engine.

Another object of my invention is the provision of a piston pivoted to a connecting rod by a wrist pin, with special wrist pin retainers for preventing longitudinal movement of said pin while allowing rotation thereof.

A further object of my invention is the provision of a novel form of piston comprising a head with a skirt depending therefrom, a cap threaded or otherwise connected to said skirt and carrying wrist pin bosses normally near the piston head, and an outer or bottom flange on said cap defining a wall of a groove for holding an oil ring.

Other objects or advantages of the invention, relating to the particular arrangement and construction of the various parts, will become apparent as the description proceeds.

Referring to the drawing:

Figure 1 is an axial sectional view of a piston, associated rings and a wrist pin, embodying my invention, portions of the associated cylinder head, cylinder, and connecting rod being also shown.

Figure 2 is a plan view of the head end of the piston.

Figure 3 is an enlarged axial sectional view corresponding with the upper right-hand corner of the piston shown in Figure 1.

Figure 4 is an enlarged fragmentary sectional view on the line IV—IV of Figure 1, in the direction of the arrows.

Figure 5 is a view corresponding generally with Figure 1, but omitting the cylinder and cylinder head portion, and showing a modification.

Figure 6 is a sectional view on the line VI—VI of Figure 5, in the direction of the arrows.

One of the problems in the construction of pistons, and especially those for internal combustion engines, is the loss of power due to leakage between the engaging walls of the cylinder and its piston. This is minimized by the employment of resilient piston rings in associated grooves in the outer or cylindrical surface of the piston, which rings bear against the engaging cylindrical surface of the cylinder and tend to prevent leakage thereby. However, it has been found that leakage also occurs between the rings and their grooves, so that a serious loss of power results, especially after said rings have worn loose.

In my pending application, Serial No. 363,855, filed November 1, 1940, I have described and claimed a flexible sealing ring or diaphragm of thin metal disposed between the surface of the conventional piston ring toward the outer surface of the piston head portion and the adjacent wall, defining the ring groove, so that cylinder pressure causes tight engagement between said thin metal ring and the adjacent conventional piston ring, thereby opposing pressure loss therebetween. The inner edge of said ring, being tightly embedded in a corresponding extension of the conventional piston ring groove, said ring is not only held in place but pressure loss therebeneath prevented.

In accordance with my present invention, I have improved on the construction of the sealing or diaphragm ring and its mode of connection to the piston, as well as provided other improvements, such as the disposition of the wrist pin in close proximity to the piston head, thereby making it possible to employ either a longer connecting rod, a shorter piston, or a smaller engine, in accordance with the improvement desired in the construction.

Referring to the drawing in detail, and first considering the embodiment of my invention illustrated in Figures 1 to 4 inclusive, the reference character 11 designates a piston embodying my invention, comprising a relatively thick head portion 12 formed, in the present instance, with a pair of peripheral grooves, 13 and 14, for receiving piston ring means which may be either double, as indicated by the rings 15 and 16 in the groove 12 or single as indicated by the ring 17 and the groove 14. The rings 15 and 16 may be considered as pressure rings, and the ring 17 as an oil ring, although they all, of course, function to minimize loss of pressure. A skirt portion, 18, extends from the peripheral portion of the head 10, and is desirably formed relatively thin, as illustrated.

From that portion of the piston adjacent to the junction between the head and skirt portions, extends an inwardly projecting annular flange 19, rigidifying the skirt portion and providing a base from which project, in the direction of the free edge of said skirt, bosses 21 and 22 providing bearings for a wrist pin 20 which passes therethrough and is shown hollow in the present embodiment. The skirt 18 is apertured, as indicated at 23 and 24, to permit insertion and removal of the wrist pin 20. After placing the pin, the same is desirably held against undesirable axial movement by means of special retainers 25 and 26, formed, as shown most clearly in Figure 4, generally like hairpins with intermediate portions bulged, as indicated at 27 and 28. These retainers are formed of a resilient material, such as spring steel wire, so that they may be snapped in place in wrist pin grooves 29 and 31. A connecting rod 45 is pivotally united to the wrist pin 20 with a bushing 46 disposed therebetween.

In order to minimize leakage along the surface between the piston 11 and the cylinder 47, the cylinder head being indicated at 48 and both formed hollow to receive cooling water indicated at 49 and 51, I provide a sealing or diaphragm ring 52, shown most clearly in Figure 3. This ring 52 is preferably formed of flexible material such as alloy steel, stainless steel, copper, brass, or the like, about .01 inch thick, with the inner peripheral portion bent axially to form a cylindrical flange 53 which will, when pushed into the groove 13, project away from the outer end surface of the piston head and in the same direction as, that is parallel to, the skirt 18 of the piston.

The sealing member 52 is of such a size that, when clamped in place in the extension 54 of the ring groove 13, as by means of a wire 55 which may be formed of copper, holding the flange 53 against the bottom of the auxiliary groove 54, its outer edge 56 is flush with the outer cylindrical surface 57 of the piston 11. The ring 52 may be placed in position generally like a piston ring, as by being cut at one place to allow for entry, spiraled into the groove, and held in place by the wire 55, which may initially be slightly larger than the width of the groove extension 54 remaining after the ring 52 is positioned, and forced to the position shown in Figure 3 to hold the member 52 tightly in place. The ends of the ring 52 are desirably secured together by silver solder or other brazing material. However, in view of the gripping ring 55, tightly holding the flexible sealing ring 52 in place, it is not necessary to solder the ends of said sealing ring.

The outer part of the head portion 12 is desirably beveled, as indicated at 58, to allow fluid from the outer portion of the cylinder to press against the outer surface of the ring 52 and hold it in tight sealing engagement with the ring 15. In this way leakage between piston and cylinder is minimized, as the rings 15 and 16 are forced together by pressure on the outer surface of said ring 52, minimizing loss of pressure between the annular outer surface of the ring 15 and the piston head, as well as between the inner cylindrical surface of said ring and the groove 13.

Leakage between the rings 15 and 16 and the other surfaces is minimized because of the pressure exerted by the flexible sealing ring 52 on the rings 15 and 16 axially of the piston. Leakage between the piston head and the sealing ring 52 is minimized because the angular extension 53 of said sealing ring is pressed in a tight engagement with the bottom of the supplemental groove 54 by the gripping ring or retainer 55.

The ring 17 functions as an oil ring in one of the customary piston ring grooves 14. This groove is here provided with passages 61 extending to the interior of the piston for returning oil which gets by the ring 17 and feeding it to the wrist pin 20 and connecting rod 45. It will, therefore, be seen that I have made a radical improvement in piston construction for minimizing loss of pressure between piston and cylinder.

Referring now to the embodiment of my invention, illustrated in Figures 5 and 6, there is shown a piston 62 comprising a head portion 63 and a skirt portion 64. The head portion is, as in the preceding embodiment, formed with a groove 65 receiving piston ring means 66. Although said means is in the present embodiment formed as a single ring, it may, if desired, be two rings like those designated 15 and 16 of the preceding embodiment. The groove 65 also receives a flexible sealing or diaphragm ring 67, desirably identical with the ring 52 of the preceding embodiment, and held in a supplemental groove or one extending from the head side of the groove 65, like the auxiliary groove 54 of the preceding embodiment, by a flexible wire 68, like that designated 55 in said first embodiment.

The head portion 63, defining the groove 65, is desirably beveled, as indicated at 69, for a reason similar to the beveling 58 of the first embodiment, so that the piston 62 is provided with sealing means identical with those of the piston 11.

In the present embodiment, however, the skirt portion 64 of the piston 62 is provided with threads, indicated at 71, and a cap 72 is provided with cooperating threads 73, for uniting it thereto, as indicated. Any desired means may be provided, such as a cotter pin or screw 74, for preventing the cap 72 from unintentionally becoming loosened from the skirt 64. The cap 72 desirably has an outer flange 75 which, when the parts are assembled, defines the outer or lower wall of a groove 76, formed by notching the outer edge of the skirt 64 to receive the ring or rings 77, which may function as an oil seal, like the ring 17 of the first embodiment, or may be additional to a ring like 17 of the first embodiment. A gasket or sealing ring 80 may be secured between the cap flange 79 and the skirt 64, like the sealing ring 71 of my application Serial No. 363,855, previously referred to.

The inner portion of the cap 72 is provided with bosses 78 and 79, apertured as indicated at 81 and 82, to provide bearings for receiving the hollow wrist pin 83. Said wrist pin, as in the preceding embodiment, may, after assembly with said portions and the connecting rod 84 and bushing 85, be held against axial movement by retainers 86 and 87, such as those designated 25 and 26 in the first embodiment.

It will, therefore, be seen that a piston is provided in which the wrist pin 83 is much closer to the head than in conventional construction. It will also be seen that application of the piston ring 77 is facilitated by making the groove receiving the same in two parts, completed upon assembly of the piston head and skirt with a cap functioning as a wrist pin carrier and comprising bearings holding the wrist pin.

From the foregoing disclosure, it will be seen that I have provided a piston which is not only improved from the standpoint of minimizing pressure loss but also with regard to the disposition of the wrist pin, whereby it is possible, if desired, to economize by decreasing the size of the engine without loss of power or other undesirable results.

It will also be understood that, whereas in one instance I have shown a pair of rings in a groove and in other instances only one ring in each groove, it is contemplated to use one or a plurality of rings in any groove, as may be desired in a given case.

Although preferred embodiments of my invention have been disclosed, it will be understood that modifications may be made within the spirit and scope of the invention, as defined by the appended claims.

I claim:

1. In combination, a piston comprising head and skirt portions, a groove in said piston, a piston ring in said groove, a flexible sealing ring of thin metal disposed between the surface of said piston ring toward the outer end surface of said head portion and the adjacent wall defining said groove, the inner portion of said sealing ring terminating in a generally cylindrical flange projecting away from the outer end surface of said head and received in a corresponding supplementary groove extending from the head side of said ring groove, to close the space between the inner cylindrical surface of the piston ring and the bottom of said groove, and means encircling said flange to hold said sealing ring in engagement with the bottom of said supplementary groove.

2. In combination, a piston comprising head and skirt portions, a groove in said piston, a piston ring in said groove, a flexible sealing ring of thin material disposed between the surface of said piston ring toward the outer end surface of said head portion and the adjacent wall defining said groove, the inner portion of said sealing ring terminating in a generally cylindrical flange projecting toward the piston skirt, the said adjacent wall defining said groove being beveled to admit fluid to the head surface of said sealing ring to cause it to press against said piston ring and minimize pressure loss, and a wire member encircling said flange to hold said sealing ring in engagement with the bottom of said groove.

3. In combination with a piston, a groove therein, a sealing ring formed of thin material, provided with a flange or cylindrical projection, and means holding said ring in place in said groove, comprising a wire pressing said flange in place.

4. A piston with a groove, piston ring means therein, said groove being formed with a supplementary portion at a side toward the head portion thereof, a sealing ring received in said supplementary portion and having an axial projection, and means engaging said axial projection and holding said ring in place.

5. A piston with a groove, piston ring means therein, said groove being formed with a supplementary portion at a side toward the head portion thereof, a sealing ring received in said supplementary portion and having an axial projection, and means engaging said axial projection and holding said ring in place, said means comprising a wire ring in said groove engaging said axial projection and holding it in the bottom of said supplementary portion.

6. In combination, a piston comprising head and skirt portions, a groove in said piston, a piston ring in said groove, a flexible sealing ring of thin metal disposed between the surface of said ring toward the outer end surface of said head portion and the adjacent wall defining the said groove, the interior portion of said sealing ring terminating in a generally cylindrical flange, projecting away from the end surface of said head portion and received in a corresponding supplemental groove extending from the head of said ring groove, to close the space between the interior cylindrical surface of the piston ring and the bottom of said groove, means formed separately from and encircling said flange to hold said sealing ring in place in said groove, a second groove adjacent to the end of the skirt portion, a piston ring in said groove, and a gasket cooperating with said second piston ring.

7. A piston with a groove, piston ring means therein, said groove having an inward annular extension, a sealing ring received in said groove and extension and having a cylindrical flange projecting from its inner edge portion, and means in said extension overlying said flange for holding said ring in place.

8. In combination, a piston, a groove in said piston, a piston ring in said groove, a flexible sealing ring of thin metal disposed between the outer surface of said piston ring and the adjacent surface of said piston to close the space between the inner cylindrical surface of the piston ring and the bottom of said groove, the inner portion of said sealing ring terminating in a flange projecting away from the outer end surface of the piston, and means formed separately from and piston, and means formed separately from and encircling said flange to hold said sealing ring in place in said groove.

CORNELIUS S. CLARK.